Dec. 11, 1951     A. FRANK     2,578,055
FLUID DRIVE

Filed Aug. 11, 1948     2 SHEETS—SHEET 1

INVENTOR.
Alexander Frank
BY
Att'y

Dec. 11, 1951 A. FRANK 2,578,055
FLUID DRIVE
Filed Aug. 11, 1948 2 SHEETS—SHEET 2
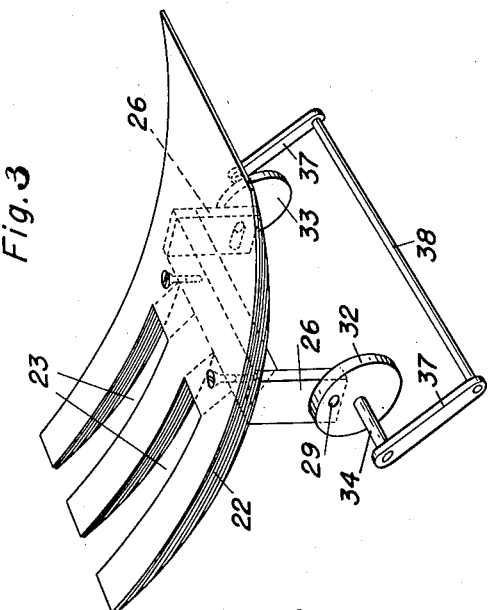
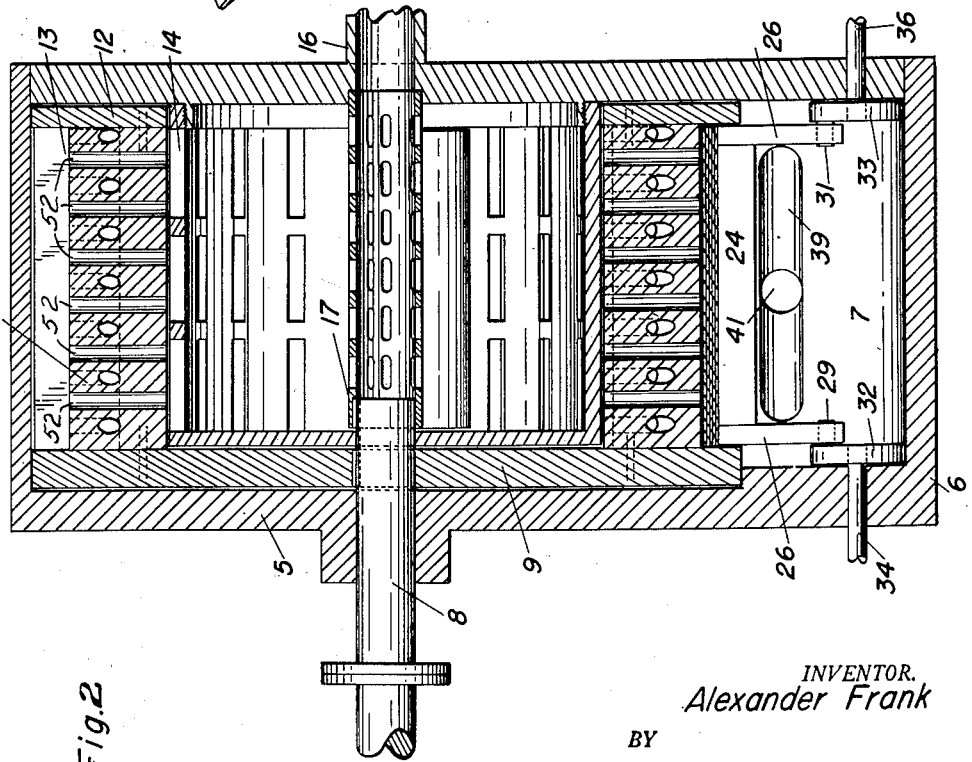
INVENTOR.
Alexander Frank
BY
Att'y Patented Dec. 11, 1951

2,578,055

UNITED STATES PATENT OFFICE 2,578,055

FLUID DRIVE

Alexander Frank, Palo Alto, Calif.

Application August 11, 1948, Serial No. 43,599

1 Claim. (Cl. 103—120)

This invention relates to improvements in fluid drive mechanisms and has particular reference to a combined pump and motor arrangement capable of use in transmitting power from the driven pump to a remotely positioned motor through the use of fluid.

The principal object of this invention is to provide a pump and valve arrangement for pumping and controlling the rate of flow of fluid therefrom.

A further object is to provide means for maintaining a balanced fluid volume in the various pump compartments.

A still further object is to produce a device of this character which may be readily assembled and serviced when necessary, a device which is economical to manufacture, one which is simple in construction and, therefore, one wherein there will be a minimum amount of wear.

Other objects and advantages will be apparent during the course of the following description.

In the accompanying drawings forming a part of this specification and in which like numerals are employed to designate like parts throughout the same:

Fig. 2 is a cross-sectional view of Fig. 1, taken on the line 2—2 of Fig. 1,

Fig. 3 is an enlarged perspective view of the pump valve.

Figure 1:
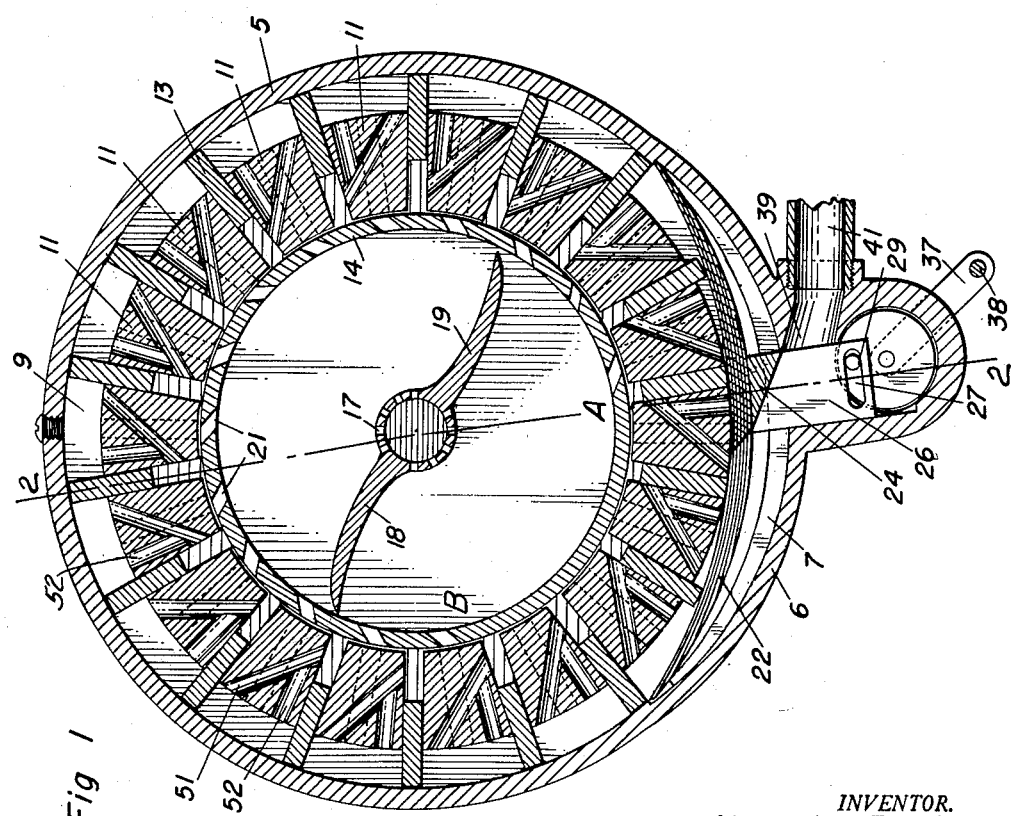
Fig. 1 is a vertical cross section of my pump unit.

There are many places where a pump and motor may be utilized for the purpose of producing a fluid drive, as, for instance, in an automobile where the pump could deliver fluid to two motors which, in turn, would drive the individual rear wheels; or motors could be directly positioned in each of the wheels so that the same would be independently driven.

I have, therefore, devised a pump which is driven by any source of power, as, for instance, a gasoline engine which, when running, will rotate a rotor in the pump which will, in turn, cause blades to force fluid within the pump either in a circular path or through a valve arrangement to a remote point for use in the motor, and by regulating the valve I may control the amount of fluid that is transmitted and, consequently, the speed of rotation of the motor at a given speed of the pump.

In the accompanying drawings wherein, for the purpose of illustration, is shown a preferred embodiment of my invention, the numeral 5 designates a substantially cylindrical housing having an offset portion 6, so as to form an offset recess 7, within the housing.

Mounted within the housing and keyed to the shaft 8, is a plate 9, having secured thereto a plurality of pump segments 11, the opposite ends of which segments are attached to an annular ring 12. Slidably positioned between each of the segments 11, are blades 13, the segments, plate and ring forming a rotor.

A cage 14, is secured to the housing and fits within the segment-like rotor in such a manner that its outer periphery is in close engagement with the interior periphery of the segment-like rotor.

Extending through the housing 5, is an intake pipe 16, which is in axial alignment with the axis of the shaft 8, whereby a strainer tube 17, keyed to the end of the axle 8, may receive discharge of fluid from a pipe thereto. This strainer tube, therefore, rotates together with the shaft 8, and causes opposed vanes 18 and 19, to rotate within the cage 14. By referring to Fig. 1 it will be noted that this cage has openings 21, therethrough from the point A, around to the point B, in a counter-clockwise direction, the purpose of which will be later seen.

The rotor has radial bores 52 for conducting fluid from the hollow space in the rotor to the space between the adjacent vanes 13.

Mounted in the recess 7, of the housing 5, is a deflector 22, built up of laminated plates and provided with slots 23, the purpose of which will be later seen. As this deflector normally has its center portion contacting the outer periphery of the rotor and its ends engaging the housing, means are provided for moving the deflector away from the rotor and into the recess 7, which means consist of a triangular valve piece 24, secured thereto, to the end of which are depending blocks 26, each of which has a slot 27 therein, adapted to be engaged by opposed pins 29 and 31, mounted in discs 32 and 33 respectively, which are rotated through the medium of shafts 34 and 36 respectively. These shafts, in turn, have depending arms 37, which are connected by a cross piece 38, so that the same may be operated in unison.

A discharge opening is shown at 39 which communicates with a discharge pipe 41.

The result of this construction is that, when the parts are assembled and the device is in operation, the shaft 8, will be rotated which will, in turn, rotate the rotor in a counter clockwise direction as viewed in Fig. 1 and assuming that the housing 5, and the cage 14, are filled with a fluid such as oil and that the deflector is in the position of Fig. 1, the action will be as follows:

The blades 18 and 19, rotating in the cage 14, will tend to force oil outwardly through the openings 21, to a point beneath the blades 13, through the bores 51 and 52, to thus maintain all of the compartments between the blades full of oil at all times. As the rotor rotates, the blades will engage the deflector and start to move inwardly, forcing the oil behind the blade through the escape bores 51 and 52, thus permitting the blade to be retracted without any back pressure. The oil, being driven by the blades, will pass through the slots 23, into the discharge opening 39 and pipe 41.

By rotating the shafts 34 and 36 and their discs 32 and 33, the blocks 26, will be moved downwardly, thus moving the deflector away from the rotor and allowing some fluid to pass the deflector. At the same time, the valve 24, will tend to cut off the discharge opening 39 and when the valve 24, has been moved to its lower-most position, all flow from the pump will stop.

It will thus be seen that I have produced a device which will accomplish all of the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In a device of the character described a housing, an annular-shaped driven rotor positioned in said housing, a cage positioned within said rotor and having its outer surface in close proximity to the inner surface of said rotor, said cage having openings formed therethrough whereby fluid entering said cage may pass therethrough, radial bores formed in said rotor to receive fluid from said cage for discharge between the outer surface of said rotor and said housing, said housing having an offset portion formed therein, a flexible deflector mounted in said offset normally having its medial portion engaging the outer surface of said rotor, radial blades carried by said rotor and capable of engaging said deflector for sliding movement into said rotor, a valve secured to said deflector, means for moving said deflector away from said rotor, said housing having a discharge port communicating therewith, said valve having sliding engagement with said port whereby movement of said deflector away from the periphery of said rotor will cause a gradual closing of said port and the simultaneous by-passing of fluid past said deflector.

ALEXANDER FRANK.

REFERENCES CITED

The following references are of record in the file of this patent:

UNITED STATES PATENTS

| Number | Name | Date |
|---|---|---|
| 972,223 | Pearson | Oct. 11, 1910 |
| 1,056,606 | Vaughan, et al. | Mar. 18, 1913 |
| 1,190,139 | Ford | July 4, 1916 |
| 2,035,465 | Erskine, et al. | Mar. 31, 1936 |
| 2,460,251 | Diaz | Jan. 25, 1949 |
| 2,477,371 | Hartzler | July 26, 1949 |